US006478282B1

United States Patent

Flemming

(10) Patent No.: US 6,478,282 B1
(45) Date of Patent: Nov. 12, 2002

(54) DEVICE FOR HOLDING PHOTOGRAPHS ON A VIDEO MONITOR

(76) Inventor: Charles E. Flemming, 2722 N. "S" , Fort Smith, AR (US) 72904

( * ) Notice: Subject to any disclaimer, the term of this patent is extended or adjusted under 35 U.S.C. 154(b) by 0 days.

(21) Appl. No.: 09/705,638

(22) Filed: Nov. 3, 2000

(51) Int. Cl.[7] .................................................. B41J 11/02

(52) U.S. Cl. ................................ 248/442.2; 248/205.2; 248/918; 40/725; 40/776; D14/114

(58) Field of Search .............................. 248/205.2, 918, 248/442.2; 40/733, 605, 725, 776, 735, 661; D6/300; D14/439

(56) References Cited

U.S. PATENT DOCUMENTS

| | | | | |
|---|---|---|---|---|
| 5,104,087 A | | 4/1992 | Wentzloff et al. | 248/442.2 |
| 5,305,537 A | * | 4/1994 | Pascarelli | 40/159 |
| 5,375,552 A | | 12/1994 | Scott | 114/363 |
| 5,398,905 A | | 3/1995 | Hinson | 248/442.2 |
| D367,857 S | * | 3/1996 | Emmerik | D14/114 |
| 5,549,267 A | * | 8/1996 | Armbruster et al. | 248/442.2 |
| 5,638,096 A | | 6/1997 | Schwartz | 248/442.2 |
| 5,678,792 A | | 10/1997 | Arguin et al. | 248/205.1 |
| D392,682 S | | 3/1998 | Johnston et al. | D20/10 |
| D408,802 S | * | 4/1999 | Hernandez | D14/114 |
| 5,890,309 A | * | 4/1999 | Markarian | 40/733 |
| D434,570 S | * | 12/2000 | Thorne et al. | D6/301 |

* cited by examiner

*Primary Examiner*—Ramon O. Ramirez
*Assistant Examiner*—Gwendolyn Baxter

(57) ABSTRACT

A device for holding photographs on a video monitor for holding photographs against the front outer surface of a video monitor includes a plate having a generally planer front side and back side. The plate has an elongated portion having a pair of ends. Each of a pair of legs is coupled to one of the ends of the elongated portion and each extends away in a parallel direction. The plate comprises a substantially transparent material. Each of a plurality of panels has a top edge, a bottom edge, and a pair of side edges. Each of the side and bottom edges of each of the panels is securely attached to the back side of the plate. The panels are spaced from each other. Each of the panels is substantially transparent. The panel is releasably securable to the video monitor.

1 Claim, 2 Drawing Sheets

12
18
20
70
22
20
22

12
18
20
70

22
20
22
12
16
38
14
36

32
36
34
34
30
26
28
10
24
30

DEVICE FOR HOLDING PHOTOGRAPHS ON A VIDEO MONITOR

BACKGROUND OF THE INVENTION

1. Field of the Invention

The present invention relates to photograph frames and more particularly pertains to a new device for holding photographs on a video monitor for holding photographs against the front outer surface of a video monitor.

2. Description of the Prior Art

The use of photograph frames is known in the prior art. More specifically, photograph frames heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,398,905; U.S. Pat. No. 5,104,087; U.S. Pat. No. 5,678,792; U.S. Pat. No. 5,638,096; U.S. Pat. Des. No. 392,682; and U.S. Pat. No. 5,375,552.

While these devices fulfill their respective, particular objectives and requirements, the aforementioned patents do not disclose a new device for holding photographs on a video monitor. The inventive device includes a plate. The plate has a generally planer front side and back side. The plate has an elongated portion having a pair of ends. Each of a pair of legs is coupled to one of the ends of the elongated portion and each extends away in a parallel direction. The plate comprises a substantially transparent material. Each of a plurality of panels has a top edge, a bottom edge, and a pair of side edges. Each of, the side and bottom edges of each of the panels is securely attached to the back side of the plate. The panels are spaced from each other. Each of the panels is substantially transparent. A plurality of securing means releasably secures the panel to the video monitor.

In these respects, the device for holding photographs on a video monitor according to the present invention substantially departs from the conventional concepts and designs of the prior art, and in so doing provides an apparatus primarily developed for the purpose of holding photographs against the front outer surface of a video monitor.

SUMMARY OF THE INVENTION

In view of the foregoing disadvantages inherent in the known types of photograph frames now present in the prior art, the present invention provides a new device for holding photographs on a video monitor construction wherein the same can be utilized for holding photographs against the front outer surface of a video monitor.

The general purpose of the present invention, which will be described subsequently in greater detail, is to provide a new device for holding photographs on a video monitor apparatus and method which has many of the advantages of the photograph frames mentioned heretofore and many novel features that result in a new device for holding photographs on a video monitor which is not anticipated, rendered obvious, suggested, or even implied by any of the prior art photograph frames, either alone or in any combination thereof.

To attain this, the present invention generally comprises a plate. The plate has a generally planer front side and back side. The plate has an elongated portion having a pair of ends. Each of a pair of legs is coupled to one of the ends of the elongated portion and each extends away in a parallel direction. The plate comprises a substantially transparent material. Each of a plurality of panels has a top edge, a bottom edge, and a pair of side edges. Each of the side and bottom edges of each of the panels is securely attached to the back side of the plate. The panels are spaced from each other. Each of the panels is substantially transparent. A plurality of securing means releasably secures the panel to the video monitor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for holding photographs on a video monitor apparatus and method which has many of the advantages of the photograph frames mentioned heretofore and many novel features that result in a new device for holding photographs on a video monitor which is not anticipated, rendered obvious, suggested, or even implied by any of the prior art photograph frames, either alone or in any combination thereof.

It is another object of the present invention to provide a new device for holding photographs on a video monitor which may be easily and efficiently manufactured and marketed.

It is a further object of the present invention to provide a new device for holding photographs on a video monitor which is of a durable and reliable construction.

An even further object of the present invention is to provide a new device for holding photographs on a video monitor which is susceptible of a low cost of manufacture with regard to both materials and labor, and which accordingly is then susceptible of low prices of sale to the consuming public, thereby making such device for holding photographs on a video monitor economically available to the buying public.

Still yet another object of the present invention is to provide a new device for holding photographs on a video monitor which provides in the apparatuses and methods of the prior art some of the advantages thereof, while simultaneously overcoming some of the disadvantages normally associated therewith.

Still another object of the present invention is to provide a new device for holding photographs on a video monitor for holding photographs against the front outer surface of a video monitor.

Yet another object of the present invention is to provide a new device for holding photographs on a video monitor which includes a plate. The plate has a generally planer front side and back side. The plate has an elongated portion having a pair of ends. Each of a pair of legs is coupled to one of the ends of the elongated portion and each extends away in a parallel direction. The plate comprises a substantially transparent material. Each of a plurality of panels has a top edge, a bottom edge, and a pair of side edges. Each of the side and bottom edges of each of the panels is securely attached to the back side of the plate. The panels are spaced from each other. Each of the panels is substantially transparent. A plurality of securing means releasably secures the panel to the video monitor.

Still yet another object of the present invention is to provide a new device for holding photographs on a video monitor that is retrofittable to existing video screens.

Even still another object of the present invention is to provide a new device for holding photographs on a video monitor that holds multiple photographs at one time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2, 3:
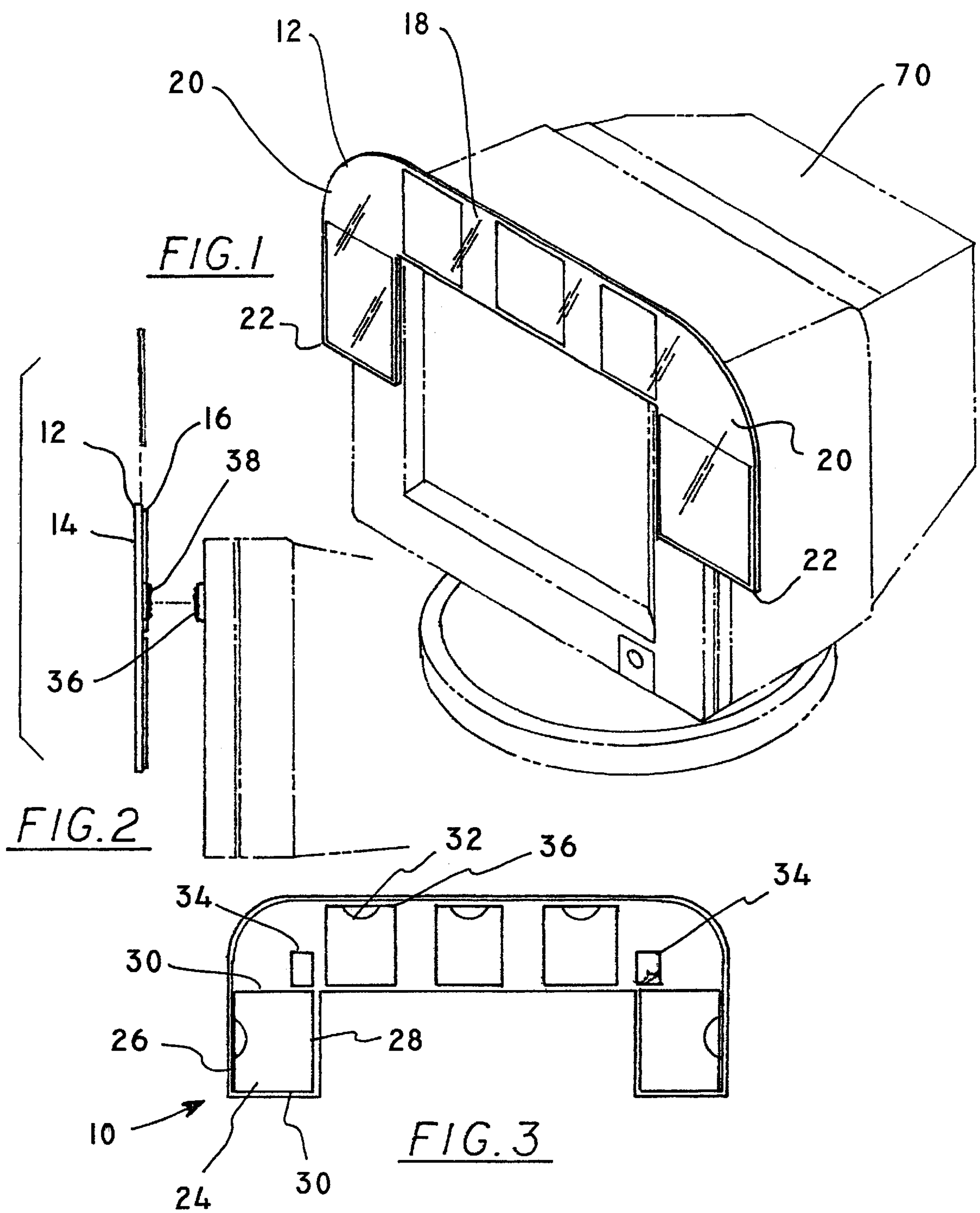
FIG. 1 is a schematic perspective view of a new device for holding photographs on a video monitor according to the present invention.
FIG. 2 is a schematic side view of the present invention.
FIG. 3 is a schematic front view of the present invention.

With reference now to the drawings, and in particular to FIGS. 1 through 6 thereof, a new device for holding photographs on a video monitor embodying the principles and concepts of the present invention and generally designated by the reference numeral 10 will be described.

As best illustrated in FIGS. 1 through 6, the device for holding photographs on a video monitor 10 generally comprises a plate 12. The plate 12 has a generally planer front side 14 and back side 16. The plate 12 has an elongated portion 18 having a pair of ends 20. Each of a pair of legs 22 is coupled to one of the ends 10 of the elongated portion 18 and each extends away in a generally parallel direction. The plate 12 is generally U-shaped and comprises a substantially transparent material. The transparent material preferably comprises a plastic. The elongated portion 18 preferably has a length generally between 13 inches and 20 inches.

Figure 4:
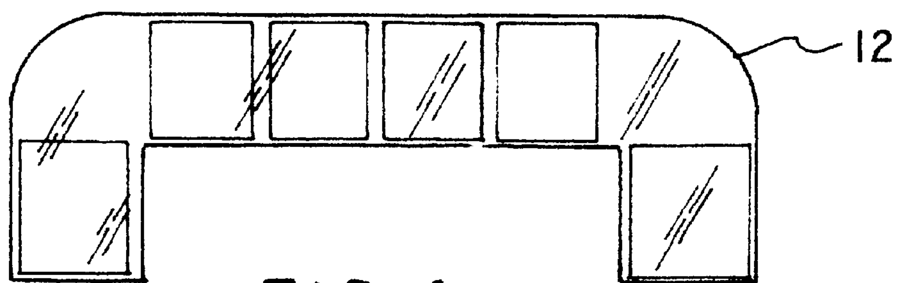
FIG. 4 is a schematic front view of the present invention.
Figure 5:
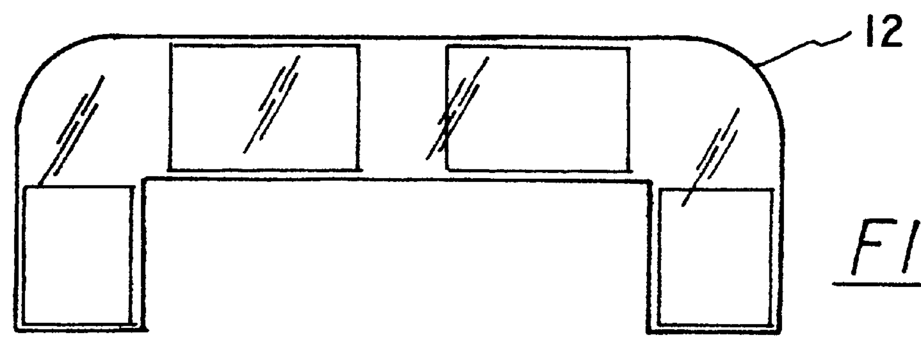
FIG. 5 is a schematic front view of the present invention.
Figure 6:
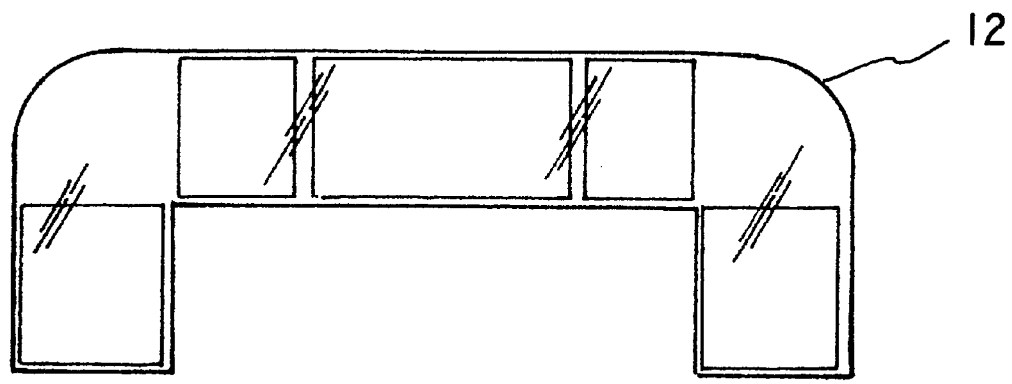
FIG. 6 is a schematic front view of the present invention.

Each of a plurality of panels 24 has a top edge 26, a bottom edge 28, and a pair of side edges 30. Each of the side 30 and bottom 28 edges of each of the panels 24 is securely attached to the back side 16 of the plate 12. Each of the top edges 26 has an arcuate depression 32 therein. The panels 24 are spaced from each other. Each of the panels 24 is substantially transparent. Ideally, there are three panels on the elongated portion 18 and each of a pair of panels on one of the pair of legs 22, however the number and size of the panels 24 may vary depending on the size of the photograph to be placed therein. FIGS. 4, 5, and 6 show the different variations.

A plurality of securing means 34 releasably secures the plate 12 to a video monitor 70. Each of the securing means 34 comprises a hook and loop securing means having a loop portion 36 and hook portion 38. The plurality of securing means is a pair of securing means 34. Each of the hook portions 38 is securely attached to the back side 16 of the elongated portion 18 of the plate 12 and spaced from each other. Each of the loop portions 36 is securely attached to the front side of the video monitor 70 and positioned such that each of the loop portions 36 may releasably engage one of the hook portions 38. The securing means may also be an adhesive.

In use, photographs are positioned between the panels and the plate. The plate is the removably attached to the video monitor so that the pictures are positioned across the top and sides of the front of the video monitor, such as a conventional computer monitor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A photograph displaying device, said device being removably mountable to a front portion of a video monitor, said device comprising:

a plate having a generally planer front side and back side, said plate having an elongated portion having a pair of ends, each of a pair of legs being coupled to one of said ends of said elongated portion and extending away in a parallel direction, said plate being generally U-shaped, said plate comprising a substantially transparent material, said transparent material comprising a plastic, said elongated portion having a length generally between 13 inches and 20 inches;

a plurality of panels, each of said panels having a top edge, a bottom edge. and a pair of side edges. each of said side and bottom edges of each of said panels being securely attached to said back side of said plate, each of said top edges having an arcuate depression therein, said panels being spaced from each other, each of said panels being substantially transparent, wherein there are three panels on said elongated portion and each of a pair of panels on one of said pair of legs, each of said panels having a width measured in a longitudinal direction of said elongated portion of said plate, a central one of said panels on said elongated portion of said plate having a width approximately twice a width of other said panels on said elongated portion of said plate; and a plurality of securing means for releasably securing said plate to the video monitor, each of said securing means comprising a book and loop securing means having a loop portion and hook portion, said plurality of securing means being a pair of securing means, each of said hook portions being securely attached to said back side of said elongated portion of said plate and spaced from each other, each of said loop portions being securely attachable to the front portion of the video monitor and positioned such that each of said loop portions may releasably engage one of said hook portions.

* * * * *